(12) United States Patent
Piccioli

(10) Patent No.: US 7,194,434 B2
(45) Date of Patent: Mar. 20, 2007

(54) METHOD FOR PREDICTIVE DETERMINATION OF FINANCIAL INVESTMENT PERFORMANCE

(76) Inventor: Sergio Piccioli, 250 E. 73rd St., New York, NY (US) 10021

( * ) Notice: Subject to any disclaimer, the term of this patent is extended or adjusted under 35 U.S.C. 154(b) by 1595 days.

(21) Appl. No.: 09/882,143

(22) Filed: Jun. 14, 2001

(65) Prior Publication Data

US 2002/0013756 A1    Jan. 31, 2002

(51) Int. Cl.
*G06Q 40/00*    (2006.01)
(52) U.S. Cl. ............................. 705/36; 705/27; 705/38; 715/853; 702/181
(58) Field of Classification Search ................. 705/36, 705/37, 38; 715/853; 702/181
See application file for complete search history.

(56) References Cited

U.S. PATENT DOCUMENTS

| 3,942,169 | A | 3/1976 | Fujimoto et al. | 340/146.3 |
|---|---|---|---|---|
| 5,109,475 | A | 4/1992 | Kosaka et al. | 395/22 |
| 5,313,560 | A | 5/1994 | Maruoka et al. | 395/54 |
| 5,414,838 | A | 5/1995 | Kolton et al. | 395/600 |
| 5,422,981 | A | 6/1995 | Niki | 395/22 |
| 5,444,819 | A | 8/1995 | Negishi | 395/22 |
| 5,461,699 | A | 10/1995 | Arbabi et al. | 395/23 |
| 5,544,281 | A | 8/1996 | Maruoka et al. | 395/68 |
| 5,664,174 | A | 9/1997 | Agrawal et al. | 395/606 |
| 5,761,386 | A | 6/1998 | Lawrence | 395/23 |
| 5,761,442 | A | 6/1998 | Barr et al. | 395/236 |
| 5,778,357 | A | 7/1998 | Kolton et al. | 707/2 |
| 5,796,611 | A | 8/1998 | Ochiai et al. | 364/420 |
| 5,832,456 | A | 11/1998 | Fox et al. | 705/10 |
| 5,893,069 | A | 4/1999 | White, Jr. | 705/1 |
| 5,918,217 | A | 6/1999 | Maggioncalda et al. | 705/36 |
| 5,956,702 | A | 9/1999 | Matsuoka et al. | 706/22 |
| 5,967,981 | A | 10/1999 | Watrous | 600/428 |

(Continued)

FOREIGN PATENT DOCUMENTS

JP    411066154 A  *  8/1997
JP    411224295 A  * 11/1998

OTHER PUBLICATIONS

Simon Benninga "Financial Modeling", Fifth edition, 1999, The MIT Press, Cambridge, Massachusetts London, England (selected pages).*

*Primary Examiner*—Hyung Sough
*Assistant Examiner*—Harish T. Dass
(74) *Attorney, Agent, or Firm*—Sofer & Haroun, LLP

(57) ABSTRACT

A method of predicting the performance of a financial variable having corresponding financial parameters represented by time series of adjacent-in-time series terms. Differential series are calculated from adjacent series terms in the financial parameter series and term trends of upward, downward and unchanged trends are then located. Cumulative variations of the term trends are calculated and are then used to identify a series of sign state progressions. A time position for a select financial parameter series term is then selected and terms in the differential series, cumulative variation series and sign state series corresponding to the time position are located. The series terms are then searched to locate prior time positions where similar term values and trends occurred. Once the prior time positions are located, the series values at time positions subsequent to the located time positions are used as a forecast for the performance of the financial variable.

28 Claims, 10 Drawing Sheets

U.S. PATENT DOCUMENTS

| | | | |
|---|---|---|---|
| 5,974,403 A | 10/1999 | Takriti et al. | 705/412 |
| 6,035,295 A | 3/2000 | Klein | 707/6 |
| 6,061,662 A * | 5/2000 | Makivic | 705/36 R |
| 6,078,904 A | 6/2000 | Rebane | 705/36 |
| 6,088,676 A | 7/2000 | White, Jr. | 705/1 |
| 6,119,103 A | 9/2000 | Basch et al. | 705/35 |
| 6,122,399 A | 9/2000 | Moed | 382/159 |
| 6,236,980 B1 | 5/2001 | Reese | 705/36 |

* cited by examiner

EXAMPLE

| | date | price | ALPHA(ti) | BETA(ti) | GAMMA(ti) |
|---|---|---|---|---|---|
| 1 | 12-Apr-00 | 55.00 | | | |
| 2 | 13-Apr-00 | 55.50 | 0.91 | 0.91 | 1up |
| 3 | 14-Apr-00 | 55.80 | 0.54 | 1.45 | 2up |
| 4 | 15-Apr-00 | 56.00 | 0.36 | 1.82 | 3up |
| 5 | 16-Apr-00 | 55.80 | -0.36 | -0.36 | 1down |
| 6 | 17-Apr-00 | 55.90 | 0.18 | 0.18 | 1up |
| 7 | 18-Apr-00 | 55.50 | -0.72 | -0.72 | 1down |
| 8 | 19-Apr-00 | 55.00 | -0.90 | -1.61 | 2down |
| 9 | 20-Apr-00 | 54.00 | -1.82 | -3.40 | 3down |
| 10 | 21-Apr-00 | 54.20 | 0.37 | 0.37 | 1up |
| 11 | 22-Apr-00 | 54.00 | -0.37 | -0.37 | 1down |
| 12 | 23-Apr-00 | 54.60 | 1.11 | 1.11 | 1up |
| 13 | 24-Apr-00 | 55.00 | 0.73 | 1.85 | 2up |
| 14 | 25-Apr-00 | 55.40 | 0.73 | 2.59 | 3up |
| 15 | 26-Apr-00 | 55.20 | -0.36 | -0.36 | 1down |
| 16 | 27-Apr-00 | 55.10 | -0.18 | -0.54 | 2down |
| 17 | 28-Apr-00 | 54.90 | -0.36 | -0.90 | 3down |
| 18 | 29-Apr-00 | 55.20 | 0.55 | 0.55 | 1up |
| 19 | 30-Apr-00 | 55.60 | 0.72 | 1.28 | 2up |
| 20 | 01-May-00 | 55.60 | 0.00 | 0.00 | 1unchanged |
| 21 | 02-May-00 | 55.70 | 0.18 | 0.18 | 1up |
| 22 | 03-May-00 | 55.80 | 0.18 | 0.36 | 2up |
| 23 | 04-May-00 | 55.85 | 0.09 | 0.45 | 3up |
| 24 | 05-May-00 | 55.40 | -0.81 | -0.81 | 1down |
| 25 | 06-May-00 | 55.60 | 0.36 | 0.36 | 1up |
| 26 | 07-May-00 | 55.75 | 0.27 | 0.63 | 2up |
| | | | ALPHA(t)* | BETA(t)* | GAMMA(t)* |

ALPHA = daily differential (<>=0)
BETA = cumulative differential of consecutive ALPHA having the same sign (<>=0)
GAMMA = cumulative sign of consecutive ALPHA having the same sign (<>=0)

FIG. 2

EXAMPLE

ALPHA(t)* = 0.27
BETA(t)* = 0.63
GAMMA(t)* = 2up

Locate values that correspond to occurrence of the following criteria, or that correspond to a plurality of the following criteria at the same time:

since ALPHA(t)* > 0

GAMMA(ti) >= GAMMA(t)*
ALPHA(ti) >=0
ALPHA(ti) >=0 and <= 0.27
ALPHA(ti) >= 0.27
ALPHA(ti) >= 0 and <= X1
ALPHA(ti) >= 0.27 and <= X1
ALPHA(ti) >=X1
ALPHA(ti) >=X1 and <= Y1
ALPHA(ti) >=Y1
BETA(ti) >=0
BETA(ti) >=0 and <=0.63
BETA(ti) >= 0.63
BETA(ti) >= 0 and <= X2
BETA(ti) >= 0.63 and <= X2
BETA(ti) >=X2
BETA(ti) >=X2 and <=Y2
BETA(ti) >=Y2 being:
0<X1<Y1
0<X2<Y2

FIG. 3

EXAMPLE step 1

Among a number of different criteria the user selects 3 of them:

GAMMA(ti)= GAMMA(t)*=2UP
ALPHA(ti)>= ALPHA(t)*=0.27
BETA(ti)>= BETA(t)*=0.63

In the time series, the following days match these criteria:
line #3      14-Apr-00
line # 13    24-Apr-00
line #19     30-Apr-00

Therefore, in the time series considered we find only 3 days matching all 3 criteria at the same time.

We selected 3 lines. X = 3.

step 2

Now we want to see what happened on the following day of these 3 days.

line #3      the day after the price went UP (see line #4).
line #13     the day after the price went UP (see line #14).
line #19     the day after the price remained UNCHANGED (see line #20).

In particular, we have:   ALPHA(ti+1)
line #4      15-Apr-00    0.36
line #14     25-Apr-00    0.73
line #20     01-May-00    0.00

Out of 3 possibilities,                                    occurrences
    UP occurred 2 times.             positive variations        2
    DOWN occurred 0 times            negative variations        0
    UNCHANGED occurred 1 time        zero variations            1
                                                      total    3

K = 2
J = 0
Y = 1   the sum of K, J and Y gives X = 3.

FIG. 4

EXAMPLE step 3

Now, we calculate the ratios Pk, Pj and Py:

Pk = K/X*100 = 66.6%
Pj = J/X*100 = 0        being the sum of them equals to 100.
Py = Y/X*100 = 33.4%

As only 1 parameter has been considered, there in no need to weigh the probabilities.
Now we can calculate the Trend Probability Index (TPI).

TPI = max(Pk;Pj)+max(Pk;Pj)/100*Py*r*s     being: s, r >0
TPI =  77.7                                 s=1 and r=0.5

As TPI is UP 77.7% it is more likely tomorrow an uptrend will take place.

step 4

Assuming we have done all previous steps for 4 parameters (High, Low, Close, Open), we have:    (values are for example)

|       | Pk    | Pj    | Py   | total  |
|-------|-------|-------|------|--------|
| High  | 55.00 | 45.00 | 0.00 | 100.00 |
| Low   | 66.00 | 30.00 | 4.00 | 100.00 |
| Open  | 75.00 | 20.00 | 5.00 | 100.00 |
| Close | 52.00 | 48.00 | 0.00 | 100.00 | now we assign a weight to each parameter:

|       | weights |
|-------|---------|
| High  | 25.00   |
| Low   | 25.00   |
| Open  | 10.00   |
| Close | 40.00   | being each of them >=0 and the sum of them equals to 100.

Now we can weigh Pk, Pj and Py for the assigned weights:

|       | PK    | PJ    | PY   | weights |
|-------|-------|-------|------|---------|
| High  | 13.75 | 11.25 | 0.00 | 25.00   |
| Low   | 16.50 | 7.50  | 1.00 | 25.00   |
| Open  | 7.50  | 2.00  | 0.50 | 10.00   |
| Close | 20.80 | 19.20 | 0.00 | 40.00   |
| Total | 58.55 | 39.95 | 1.50 | 100.00  |

The sum of Pk1, Pk2 and Pk3 gives PK = 58.55
The sum of Pj1, Pj2 and Pj3 gives PJ = 39.95
The sum of Py1, Py2 and Py3 gives PY = 1.50

The Trend Probability Index (TPI) can now be calculated.

TPI = max(Pk;Pj)+max(Pk;Pj)/100*Py*r*s     being: s, r >0
TPI =  59.4                                 s=1 and r=1

As TPI is UP 59.4% it is more likely tomorrow an uptrend will take place.

FIG. 5

GENERAL CRITERIA FOR SELECTION

*for each possible* $ALPHA(t-n)^*$ being t the time of the Last Available Data and n=0, 1, 2....

**$ALPHA(t-n)^* >= 0$**

$GAMMA(ti-n) >= GAMMA(t-n)^*$
$ALPHA(ti-n) >= X1$    being:
$X1 <= ALPHA(ti-n) <= Y1$    $0 <= X1 < Y1$
$BETA(ti-n) >= X2$
$X2 <= BETA(ti-n) <= Y2$    $0 <= X2 < Y2$

**$ALPHA(t-n)^* <= 0$**

$GAMMA(ti-n) <= GAMMA(t-n)^*$
$ALPHA(ti-n) <= X1$    being:
$X1 >= ALPHA(ti-n) >= Y1$    $0 >= X1 > Y1$
$BETA(ti-n) <= X2$
$X2 >= BETA(ti-n) >= Y2$    $0 >= X2 > Y2$

GENERAL CRITERIA FOR SELECTION

2 for *each possible* ALPHA(t-n)*
being t the time of the Last Available Data and n=0, 1, 2....

ALPHA(t-n)* >= 0

GAMMA(ti-n) >= GAMMA(t-n)*
ALPHA(ti-n) >=0
ALPHA(ti-n) >=0 and <=ALPHA(t-n)*
ALPHA(ti-n) >=ALPHA(t-n)*
ALPHA(ti-n) >= 0 and <= X1           being:
ALPHA(ti-n) >= ALPHA(t-n)* and <= X1    0<X1<Y1
ALPHA(ti-n) >=X1                      0<X2<Y2
ALPHA(ti-n) >=X1 and <= Y1
ALPHA(ti-n) >=Y1
BETA(ti-n) >=0
BETA(ti-n) >=0 and <=BETA(t-n)*
BETA(ti-n) >=BETA(t-n)*
BETA(ti-n) >= 0 and <= X2
BETA(ti-n) >= BETA(t-n)* and <= X2
BETA(ti-n) >=X2
BETA(ti-n) >=X2 and <= Y2
BETA(ti-n) >=Y2

ALPHA(t-n)* <= 0

GAMMA(ti-n) <= GAMMA(t-n)*
ALPHA(ti-n) <=0
ALPHA(ti-n) <=0 and >=ALPHA(t-n)*
ALPHA(ti-n) <=ALPHA(t-n)*
ALPHA(ti-n) <= 0 and >= X1           being:
ALPHA(ti-n) <= ALPHA(t-n)* and >= X1    0>X1>Y1
ALPHA(ti-n) <=X1                      0>X2>Y2
ALPHA(ti-n) <=X1 and >= Y1
ALPHA(ti-n) <=Y1
BETA(ti-n) <=0
BETA(ti-n) <=0 and >= BETA(t-n)*
BETA(ti-n) <=BETA(t-n)*
BETA(ti-n) <= 0 and >= X2
BETA(ti-n) <= BETA(t-n)* and >= X2
BETA(ti-n) <=X2
BETA(ti-n) <=X2 and >= Y2
BETA(ti-n) <=Y2

FIG. 7

PARAMETERS TO BE USED FOR THE TIME SERIES  pag.1 /2
TIME UNIT = ti

| | | parameter | DESCRIPTION<br>In the time unit, the value of each parameter is equivalent to the following: |
|---|---|---|---|
| 1 | 1 | MAX | the highest value |
| 2 | 2 | MIN | the lowest value |
| 3 | 3 | OPEN | the first value |
| 4 | 4 | CLOSE | the last value |
| 5 | 5 | MID | (MAX+MIN)/2 |
| 6 | 6 | CLOP | (OPEN+CLOSE)/2 |
| 7 | 7 | MICLO | (MIN+CLOSE)/2 |
| 8 | 8 | MACLO | (MAX+CLOSE)/2 |
| 9 | 9 | MIDCLO | (MID+CLOSE)/2 |
| 10 | 10 | OPMAX | (MAX+OPEN)/2 |
| 11 | 11 | OPMIN | (OPEN+MIN)/2 |
| 12 | 12 | MAXMID | (MAX+MID)/2 |
| 13 | 13 | MINMID | (MID+MIN)/2 |
| 14 | 14 | MIDCLOP | (MID+CLOP)/2 |

The above-listed parameters are defined THE TREND PARAMETERS, as a whole.

| | | | hereinafter, ti-1 is defined as the period of time immediately previuos period t.<br>by definition, ti-1 is as long as ti. |
|---|---|---|---|
| 15 | 1 | CLOSEOPEN | the value consistent with the output resulting from the following:<br>((OPEN(ti)-CLOSE(ti-1))/CLOSE(ti-1))*100 |
| 16 | 2 | MIDOPEN | the value consistent with the output resulting from the following:<br>((OPEN(ti)-MID(ti-1))/MID(ti-1))*100 |
| 17 | 3 | CLOPOPEN | the value consistent with the output resulting from the following:<br>((OPEN(ti)-CLOP(ti-1))/CLOP(ti-1))*100 |
| 18 | 4 | MIDCLOPEN | the value consistent with the output resulting from the following:<br>((OPEN(ti)-MIDCLO(ti-1))/MIDCLO(ti-1))*100 |
| 19 | 5 | MIDCLOPOPEN | the value consistent with the output resulting from the following:<br>((OPEN(ti)-MIDCLOP(ti-1))/MIDCLOP(ti-1))*100 |
| 20 | 6 | MIDCLOSE | the value consistent with the output resulting from the following:<br>((CLOSE(ti)-MID(ti-1))/MID(ti-1))*100 |
| 21 | 7 | CLOPCLOSE | the value consistent with the output resulting from the following:<br>((CLOSE(ti)-CLOP(ti-1))/CLOP(ti-1))*100 |
| 22 | 8 | MACLOCLOSE | the value consistent with the output resulting from the following:<br>((CLOSE(ti)-MACLO(ti-1))/MACLO(ti-1))*100 |
| 23 | 9 | MICLOCLOSE | the value consistent with the output resulting from the following:<br>((CLOSE(ti)-MICLO(ti-1))/MICLO(ti-1))*100 |
| 24 | 10 | MIDCLOCLOSE | the value consistent with the output resulting from the following:<br>((CLOSE(ti)-MIDCLO(ti-1))/MIDCLO(ti-1))*100 |
| 25 | 11 | MIDCLOPCLOSE | the value consistent with the output resulting from the following:<br>((CLOSE(ti)-MIDCLOP(ti-1))/MIDCLOP(ti-1))*100 |
| 26 | 12 | CLOSEMID | the value consistent with the output resulting from the following:<br>((MID(ti)-CLOSE(ti-1))/CLOSE(ti-1))*100 |
| 27 | 13 | MACLOMID | the value consistent with the output resulting from the following:<br>((MID(ti)-MACLO(ti-1))/MACLO(ti-1))*100 |
| 28 | 14 | MICLOMID | the value consistent with the output resulting from the following<br>((MID(ti)-MICLO(ti-1))/MICLO(ti-1))*100 |
| 29 | 15 | MIDCLOMID | the value consistent with the output resulting from the following:<br>((MID(ti)-MIDCLO(ti-1))/MIDCLO(ti-1))*100 |
| 30 | 16 | MIDCLOPMID | the value consistent with the output resulting from the following:<br>((MID(ti)-MIDCLOP(ti-1))/MIDCLOP(ti-1))*100 |

The above-listed parameters are defined THE ADD-TREND PARAMETERS, as a whole.

TABLE - FIG. 8 A

| | | | | |
|---|---|---|---|---|
| 31 | 1 | MA-OP | (MAX-OPEN)/OPMAX*100 | pag.2 /2 |
| 32 | 2 | OP-MI | (OPEN-MIN)/OPMIN*100 | |
| 33 | 3 | MA-MI | (MAX-MIN)/MID*100 | |
| 34 | 4 | MA-CL | (MAX-CLOSE)/MACLO*100 | |
| 35 | 5 | CL-MI | (CLOSE-MIN)/MICLO*100 | |
| 36 | 6 | OP-CL | the absolute value of((CLOSE-OPEN)/CLOP*100) | |

The above-listed parameters are defined THE VOLATILITY PARAMETERS, as a whole.

Number of Trend Parameters: 14
Number of Add-Trend Parameters: 16
Number of Volatility Parameters: 6

Total number of parameters: 36

\* \* \*

EXAMPLE

| | date | price | A | B | C | D |
|---|---|---|---|---|---|---|
| 1 | 12-Apr-00 | 55.00 | | | | |
| 2 | 13-Apr-00 | 55.50 | 0.91 | | | |
| 3 | 14-Apr-00 | 55.80 | 0.54 | 1.45 | | |
| 4 | 15-Apr-00 | 56.00 | <u>0.36</u> | 0.90 | 1.82 | |
| 5 | 16-Apr-00 | 55.80 | -0.36 | <u>0.00</u> | 0.54 | 1.45 |
| 6 | 17-Apr-00 | 55.90 | 0.18 | -0.18 | <u>0.18</u> | 0.72 |
| 7 | 18-Apr-00 | 55.50 | -0.72 | -0.54 | -0.89 | <u>-0.54</u> |
| 8 | 19-Apr-00 | 55.00 | -0.90 | -1.61 | -1.43 | -1.79 |
| 9 | 20-Apr-00 | 54.00 | -1.82 | -2.70 | -3.40 | -3.23 |
| 10 | 21-Apr-00 | 54.20 | 0.37 | -1.45 | -2.34 | -3.04 |
| 11 | 22-Apr-00 | 54.00 | -0.37 | 0.00 | -1.82 | -2.70 |
| 12 | 23-Apr-00 | 54.60 | 1.11 | 0.74 | 1.11 | -0.73 |
| 13 | 24-Apr-00 | 55.00 | 0.73 | 1.85 | 1.48 | 1.85 |
| 14 | 25-Apr-00 | 55.40 | <u>0.73</u> | 1.47 | 2.59 | 2.21 |
| 15 | 26-Apr-00 | 55.20 | -0.36 | <u>0.36</u> | 1.10 | 2.22 |
| 16 | 27-Apr-00 | 55.10 | -0.18 | -0.54 | <u>0.18</u> | 0.92 |
| 17 | 28-Apr-00 | 54.90 | -0.36 | -0.54 | -0.90 | <u>-0.18</u> |
| 18 | 29-Apr-00 | 55.20 | 0.55 | 0.18 | 0.00 | -0.36 |
| 19 | 30-Apr-00 | 55.60 | 0.72 | 1.28 | 0.91 | 0.72 |
| 20 | 01-May-00 | 55.60 | <u>0.00</u> | 0.72 | 1.28 | 0.91 |
| 21 | 02-May-00 | 55.70 | 0.18 | <u>0.18</u> | 0.91 | 1.46 |
| 22 | 03-May-00 | 55.80 | 0.18 | 0.36 | <u>0.36</u> | 1.09 |
| 23 | 04-May-00 | 55.85 | 0.09 | 0.27 | 0.45 | <u>0.45</u> |
| 24 | 05-May-00 | 55.40 | -0.81 | -0.72 | -0.54 | -0.36 |
| 25 | 06-May-00 | 55.60 | 0.36 | -0.45 | -0.36 | -0.18 |
| 26 | 07-May-00 | 55.75 | 0.27 | 0.63 | -0.18 | -0.09 |

In column A:
in regular printing, all values of ALPHA(ti)
in bold, all values selected according to the criteria related to ALPHA(t)*, BETA(t)*, GAMMA(t)*
in underlined, all values of ALPHA(ti+1) related to the selected values.

In column B:
in underlined, all values of ALPHA(ti+2) related to the selected values.
In column C:
in underlined, all values of ALPHA(ti+3) related to the selected values.
In column D:
in underlined, all values of ALPHA(ti+4) related to the selected values.

FIG. 9

METHOD FOR PREDICTIVE DETERMINATION OF FINANCIAL INVESTMENT PERFORMANCE

BACKGROUND OF THE INVENTION

1. Field of the Invention

The present invention is directed to a method of forecasting the short run trend of a financial variable and, in particular, of forecasting performance of investment instruments such as stocks, bonds, commodities, etc.

2. Description of the Related Art

With the development of statistical analysis and the long-standing interest in the performance of the financial markets, numerous methods have been developed and utilized in an attempt to forecast future trends of financial variables, such as the prices of stocks, bonds and commodities. Such methods typically apply financial analysis tools characterized by a high degree of statistical rigor without consideration of the actual past occurrences affecting the financial market. Trends in financial markets are a mixture of rational and irrational factors. Existing forecasting tools which are grounded in technical data analysis, such as moving averages, momentum indicators, pattern graphs or theories about cycles or periodic waves are based on ineffective algorithms which yield ineffective results.

SUMMARY OF THE INVENTION

The present invention provides a computerized or automated method of predicting financial market performance and, in particular, stock and financial instrument performance based on an analysis of various factors and market indicators. The inventive method is based on time series of variables associated with a particular item of interest or target data such as the price of a particular company stock, and is used to determine the probability that a condition of the target data will occur, e.g. whether a stock price will increase. This is accomplished by analyzing multiple time series associated with the target data, such as the closing price, opening price, differences between closing and opening prices, etc., for successive trading days. This analysis yields a plurality of differential time series for various parameters associated with the target dates. The differential time series are then examined to locate continuous trends or subseries where, for example, the stock price increases over several days, etc., and statistical calculations are then performed on the subseries to yield a probability of the occurrence of a particular condition.

In a preferred embodiment, the statistical series calculations are performed on three classes of parameter series, referred to as Trend Parameters (TP), Additional Trend (Add-Trend) Parameters (ATP), and Volatility Parameters (VP), and weighting factors are used to increase or decrease the relative significance of select parameters based upon user specified conditions.

BRIEF DESCRIPTION OF THE DRAWINGS

In the drawings:

FIG. 2 is an example of a parameter time series and several variable time series derived therefrom for use with the inventive method;

FIG. 3 shows certain criteria conditions for performing a step of the inventive method;

FIGS. 4 and 5 depict additional steps of the inventive method;

FIGS. 6–7 show alternative criteria to those listed in FIG. 3;

FIGS. 8A and 8B are listings of parameters and their definitions for use with the present invention; and FIG. 9 is an example of calculating several variable time series derived from the parameters of FIGS. 8A and 8B for use with the method.

DETAILED DESCRIPTION OF THE PRESENTLY PREFERRED EMBODIMENTS

Section 1

Figure 1:
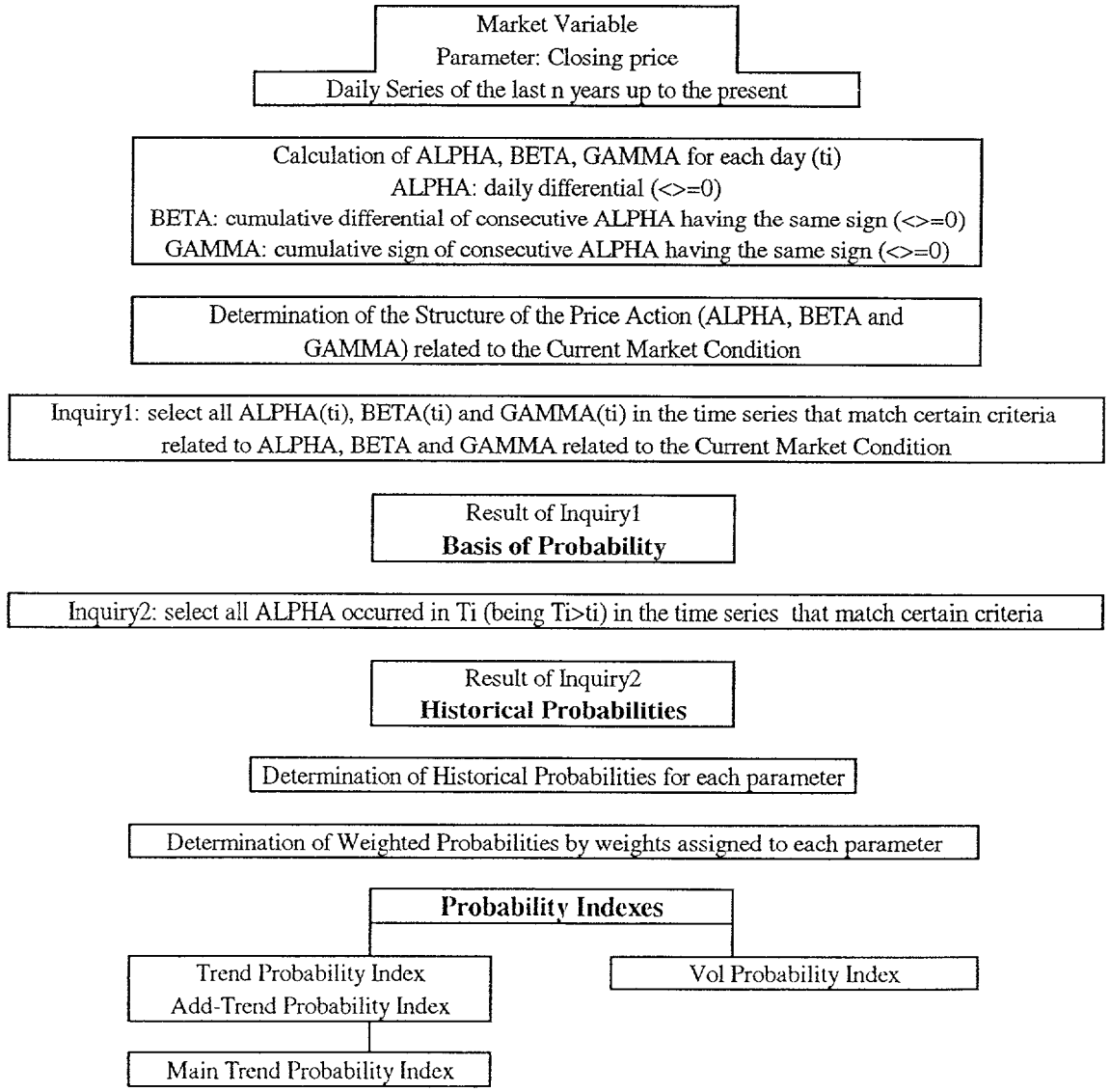
FIG. 1 depicts a flow chart of the inventive method.

The predictive determination method in accordance with the present invention for estimating market performance of a market variable is illustrated in the flow chart of FIG. 1. The method is used to calculate, based on a plurality of parameters, the probability that a certain result may occur concerning a market variable, such as a company stock, bond, treasury note, commodity, etc. A presently preferred list of the plurality of parameters used in the inventive method is contained in the table of FIGS. 8A and 8B. The parameters are segregated or grouped or arranged into a Trend Parameters (TP), Additional Trend or Add-Trend Parameters (ATP), and Volatility Parameters (VP). As presently contemplated, there are 36 total parameters (14 TP, 16 ATP and 6 VP) which are defined in the table. It is noted that the parameter list contained in the table is non-exhaustive and additional parameters or substitute parameters may be used without departing from the scope of the present invention. Likewise, fewer than 36 parameters can be used with the inventive method.

The method utilizes a history or time series of each of the selected parameters as a basis for the probability calculations. For example, if the information or data sought concerns a particular company stock, such as IBM, a starting time or date is selected (e.g. May 2, 1970) and values of each selected parameter are obtained to establish a plurality of time series (one for each parameter) from the starting date to the present date. Presumably, there will be a series term for each date in which the IBM stock is traded from the starting date through the present, thereby resulting in a plurality of numeric series containing successive-in-time terms. As an example, if one of the parameters is a Trend Parameter and, in particular, the closing price of IBM stock for each trading day, the closing price Trend Parameter series will contain the closing prices of successive-in-time trading days from the start date until the present. The goal of the present invention is then to provide an analysis method or tool to forecast or predict the closing price that will occur in the near future, i.e. the next trading day or the trading day following the next trading day, etc. The time series needed for performing the predictive method are preferably obtained from one or more databases containing financial market data.

Once the time series corresponding to each selected parameter is obtained, a differential between successive adjacent-in-time terms in each series is calculated. Thus, if the parameter is the closing price of a stock, the differences between adjacent daily closing prices will be obtained. For a series of n terms, this will result in n–1 calculations having the possibility of positive values (signifying an increase in price between adjacent days), negative values (signifying a decrease in price between adjacent days), and zero values (signifying no change). For Trend Parameters and Add-Trend Parameters, a percentage variation (PV) of the resulting series values is designated as ALPHA and calculated as PV=[(V(ti)−V(ti−1)/V(ti−1)]* 100, where i=1,2, . . . , n−1; PV can be positive, negative or equal to zero. For the Volatility Parameter series ALPHA is the simple variation (SV), calculated as SV=V(ti)−V(ti−1); where SV can be positive, negative or equal to zero.

With reference to the example shown in FIG. 2, a closing price Trend Parameter series is shown having 26 values from April 12 through May 7, 2000. It should be noted that the value dates are successive for the sake of simplicity and that for an actual investment instrument, the series terms will correspond to a 5-day trading week (Monday-Friday). As shown, the value of ALPHA for the second series term (corresponding to April 13) is 0.91%, given by PV=(55.5−55)/55*100; for the third day (April 14), the value of ALPHA is 0.54%, given by PV=[(55.80−55.50)/55.50] * 100, and for the fourth day is 0.36%, and so on.

Once the ALPHA series for each parameter series is obtained, each ALPHA(ti) series is examined to locate multiple day trends or subseries. Such subseries are designated when a common trend (up, down or unchanged) occurs. Thus, and with reference to the example of FIG. 2, ALPHA(ti) shows a three-day up trend from April 13 through April 15 followed by a single day down trend, a single day up trend, a three day down trend from April 18 through April 20, etc. After the subseries of multiday increases/decreases are located, the percentage variation (in the case of a Trend or Add Trend Parameter) or the simple variation (in the case of a Volatility Parameter) is calculated for the parameter values corresponding to the local subseries: each local subseries or trend is given by all consecutive ALPHA(ti) having the same sign (positive, negative, unchanged). The cumulative variations of all consecutive ALPHA(ti) having the same sign are designated as BETA. Thus, the Trend Parameter (closing price) of the example in FIG. 2 has a three-day increase trend from April 13 through April 15. The first parameter value in this trend is 55.00. The first BETA value therefore is [(55.5−55)/55]* 100, or 0.91%. The second BETA value is [(55.8−55)/55]* 100, or 1.45%, and the third value is [(56−55)/55]* 100 or 1.82%. Thus, for every n-day trend, there are n−1 BETA(ti) values. It is also noted that the first value of BETA for each new trend equals the corresponding value of ALPHA and that the sign trends for ALPHA and BETA are equivalent such that when ALPHA is positive, BETA is positive and vice versa.

Once the BETA series for each parameter is obtained, each BETA(ti) series is examined to locate the sign and the sequence of multiple day trends or subseries. This performance trend is designated as GAMMA and, as shown in FIG. 2, corresponds to the price as well as the values of ALPHA and BETA. Thus, for the first value term (April 13) GAMMA is "1 up", for the second value term (April 14) GAMMA is "2 up", for the third value term, GAMMA is "3 up", for the fourth value term, GAMMA is "1 down", and so on. It should be noted that GAMMA has the same sign as ALPHA and BETA.

Thus, and as explained above, for a series of n terms, for each parameter, n−1 ALPHA(ti), BETA(ti) and GAMMA(ti) are calculated, where i=1,2, . . . (n−1). ALPHA is the variation of adjacent-in-time term values (example in FIG. 2, 0.91%, 0.54%, or 0.36%); BETA is the cumulative variation (example, 0.91%, 1.45%, 1.82%) of all consecutive ALPHA having the same sign (positive, negative, unchanged); and GAMMA is the cumulative variation sign (example, "1 up", "2 up", "3 up") of all consecutive ALPHA having the same sign.

After the series terms for ALPHA(ti), BETA(ti) and GAMMA(ti) are determined, the values of these series terms at the present day are selected as a reference or comparison guide for use in predicting the parameter performance in the following parameter trading day. The series are examined to select past values that correspond or correlate with the present day values based on certain series criteria. For example, the present or last available values for ALPHA, BETA and GAMMA in FIG. 2 are 0.27, 0.63 and "2 up", respectively. These values are designated as ALPHA(t)*, BETA(t)* and GAMMA(t)* and they represent the structure of the price action (ALPHA, BETA and GAMMA) related to the current market condition.

Section 2

A search is then conducted in the time series of ALPHA, BETA and GAMMA for each parameter to ascertain the parameter values concurring with the values of ALPHA(ti), BETA(ti) and GAMMA(ti) that match certain criteria based on the present values ALPHA(t)*, BETA(t)* and GAMMA (t)*. Preferred criteria in locating concurring values are listed in FIG. 3, wherein for the example of FIG. 2, a search is conducted for ALPHA(t)*>=0.27, BETA(t)*>=0.63 and GAMMA(t)*=2up. Alternatively, other criteria could have been selected, such as ALPHA(t)*>=0, BETA(t)*>=0 and GAMMA(t)*=2up, i.e. for an ALPHA value within an established range (e.g. between 0 and the value of ALPHA (t)* (0.27)). As a further alternative, the search may locate values of ALPHA and BETA based on criteria that coincide with the GAMMA(t)* value, e.g., ALPHA between 0 and ALPHA(t)* with corresponding BETA between 0 and BETA (t)*. Numerous criteria can be selected for this purpose and several examples are depicted in FIGS. 6–7. The following criteria are presently preferred as the General Criteria of Selection/Inquiry to determine the basis of probability:

For Values of ALPHA(t)* Positive or Equal to Zero
  $GAMMA_{(ti)}$=>GAMMA(t)*;
  $ALPHA_{(ti)}$=>X1;
  X1<=$ALPHA_{(ti)}$=<Y1; where 0<=X1<Y1, 0<=X2<Y2
  $BETA_{(ti)}$=>X2;
  X2<=$BETA_{(ti)}$=<Y2;

For Values of ALPHA(t)* Negative or Equal to Zero
  $GAMMA_{(ti)}$=<GAMMA(t)*;
  $ALPHA_{(ti)}$=<X1;
  Y1<=$ALPHA_{(ti)}$=<X1; where 0>X1>Y1, 0>=X2>Y2
  $BETA_{(ti)}$=<X2;
  Y2<=$BETA_{(ti)}$=<X2;

In FIG. 4, the step-by-step analysis is listed according to the example of FIG. 2 and the criteria of FIG. 3. In that case, the criteria are GAMMA(ti)=GAMMA(t)*=2up; ALPHA (ti)=>ALPHA(t)*=0.27 and BETA(ti)>=BETA(t)*=0.63. Three days are located in FIG. 2 which satisfy such criteria at the same time, namely, line number 3 (April 14); line number 13 (April 24) and line number 19 (April 30). This is shown in step 1 of FIG. 4. Once this calculation is performed and the number of parameter term occurrences satisfying a user specified criteria for ALPHA, BETA and GAMMA is determined, the total number of occurrences or "hits" are summed as X. In FIG. 4, X=3 which is defined as the basis of probability.

Section 3

The values of the next-occurring or successive ALPHA values following the determination of the values comprising X are then obtained. For example, if the values of ALPHA (ti), BETA(ti) and GAMMA(ti) meeting the selected criteria correspond to a time (ti), e.g. April 14, the value at t+1 (e.g. April 15) is selected (ALPHA at (ti+1)=0.36).

Based on this result obtained from the ALPHA(ti), BETA (ti) and GAMMA(ti) values of each parameter time series (Trend, Add-Trend and Volatility parameters), the variations of ALPHA(ti+1) are grouped according to their sign and summed. Specifically, the amount of all occurrences of positive ALPHA(ti+1) are added and defined as K; the amount of all occurrences of negative ALPHA(ti+1) are added and defined as J; and the amount of occurrences of ALPHA(ti+1) equal to zero is identified as Y. The sum of K+J+Y=X. In FIG. 4, K=2, J=0, Y=1. From these values, the percentage values can be determined as Pk=(K/X)*100, Pj=(J/X)*100, Py=(Y/X)*100. By definition, the sum of Pk, Pj and Py is equal to 100.

Given the time series and the so calculated basis of probability, the percentage values of Pk, Pj and Py represent the historical probability of a positive, negative and neutral variation, respectively, that an up trend, down trend and unchanged trend will occur on the following day. If these calculations are performed on the parameters listed in FIGS. 8A and 8B, a result of 14 Trend Parameters Pk, Pj and Py, 16 Add-Trend Parameters Pk, Pj and Py, and 6 Volatility Parameters Pk, Pj and Py will be realized.

The categories of the historical probability calculations are then considered separately and weighting factors can be assigned based upon a particular user's preference. Preferably, each parameter in each parameter series will have a corresponding weighting factor. Each weighting factor (Wi) is a positive fraction used to form a product with its corresponding probability factor, and then a sum of all products is calculated. Thus, in the case of the 14 Trend Parameters, there are 14 weighting factors (W1–W14) and the following sums are calculated:

$$PK=Pk1*W1+Pk2*W2+\ldots+Pk14*W14$$

$$PJ=Pj1*W1+Pj2*W2+\ldots+Pj14*W14$$

$$PY=Py1*W1+Py2*W2+\ldots+Py14*W14$$

The weighting factors are used to selectively discount and/or add significance to certain parameters. For example, if a user considers a stock closing price to be of particular importance relative to a different parameter (e.g. a stock opening price), then the opening price trend parameter may be assigned a weight smaller than a weight assigned to the closing price weight parameter. The resulting calculations (i.e. PK, PJ, PY) are performed for the Add-Trend and Volatility Parameters as well.

The probability index for the Trend, Add-Trend and Volatility Parameters are then calculated from the resulting weighted probabilities to achieve a probability that a particular event may occur, e.g. that a stock price will increase or decrease, the volatility surrounding the prediction, etc. This is accomplished from the sum of the greater of the maximum value of either PK or PJ, i.e., max(PK;PJ), and a weighted ratio of that maximum number, i.e. max(PK;PJ)/100*PY*r*s, where s and r are additional weighting factors used to add or remove significance to the particular probability indices and of the discount factor max(PK;PJ)/100, and assuming PY values are negligible. Thus, the Trend Probability Index is calculated by:

Trend Probability Index (TPI)=max(PK;PJ)+max(PK;PJ)/100*PY*r*s In general, s and r are greater than zero and are used to customize the importance of factor PY, i.e. the importance of unchanged trend probability.

The Add-Trend Probability Index and the Volatility Probability Index are given by the same Trend Probability Index formula as set forth above except that the values of PK, PJ and PY are taken from the Add-Trend and Volatility Trend parameters, respectively.

In the example listed in FIG. 5 step 4, four parameters have been considered, namely, high, low, open and closing prices—weighted by 25%, 25%, 10%, and 40% respectively. PK, which represent the historical probability that an uptrend will occur is equal to 58.55, whereas PJ, which represent the historical probability that a downtrend will occur is equal to 39.95. PY which represents the historical probability the price will not change is equal to 1.50. The Trend Probability Index (TPI) represents the synthetic indicator of the trend as explained by the calculated historical probabilities. In the example, TPI is equal to "UP 59.4%", and it indicates that tomorrow it is more likely that an uptrend will occur. Should for example TPI be "DOWN 66%", it would indicate that tomorrow it is more likely a downtrend would occur.

Once the Trend, Add-Trend and Volatility Probability Indexes are calculated as above, the same process is performed for the Main Parameters, i.e. the non-volatility parameters listed in FIG. 8A. In other words, in FIG. 8A there are 30 non-volatility or "main parameters" and in FIG. 8B there are 6 volatility parameters. Thus, 30 weights are used, and the Main Trend Probability Index is calculated as:

MTPI=max(PK;PJ)+max(PK;PJ)/100*PY*r*s; where, as above, s and r are additional weighting factors used to add or remove significance to the particular probability indices and of the discount factor max(PK;PJ)/100, and assuming PY values are negligible.

Section 4

In Section 3 historical probabilities are calculated by taking into consideration all values of ALPHA(ti+1) related to the selected values of ALPHA(ti). When we say all values we mean all positive values related to positive ALPHA, all negative values related to negative ALPHA and so on. In other words, so far we have not taken into account the amount of the variation, just the sign. Now, we want to consider even the amount of the variation occurred in ALPHA(t+1). The difference is implied in the following questions: "what is the probability that tomorrow the closing price will go up?" and "what is the probability that tomorrow the closing price will go up by at least 1%?".

Therefore, the invention can give an answer to questions like the following: what is the probability that the today IBM closing price will change by at least −0.10% tomorrow? Once we have determined the basis of probability—according to the criteria related to GAMMA(t)*, ALPHA(t)* and BETA(t)* as described in Section 2.—the selection of values in ALPHA(ti+1) will regard only those values smaller than −0.10%, regardless values greater than −0.10%. Were the question "what is the probability that the today IBM closing price would change by at least 1.0% tomorrow", we would select all those values of ALPHA(ti+1) equals to 1.0% or greater, without taking into consideration all values smaller than 1.0%. Assuming for example that the basis of probability (X) is 80 occurrences (in ALPHA(ti)), and that in ALPHA(ti+1) we find out 3 unchanged values, 22 negative values, 40 positive values smaller than 1% and 15 values greater than 1%, the probability will be given by the ratio 15/80*100=18.75%. Were the inquiry "what is the probability that the today IBM closing price will increase by not more than 1.0% tomorrow", the probability would be given by the ratio 40/80*100=50%. In general, given a certain basis of probability (see Section 2), the probability that the today (t) IBM closing price will change by at least −0.10% tomorrow (t+1) can be generalized by saying that −0.10% can be defined ALPHA(t+1)*% equals to $(V_{(t+1)*}-V_{(t)})/V_{(t)}$, being V(t) the today IBM closing price and V(t+1)* what we define the target price, that is to say, the desired or projected price for tomorrow (t+1). In the example, assuming V(t)=55 and ALPHA(t+1)*=−0.10%, V(t+1)* is equal to 54.945. In this case, the probability is given by the percentage ratio between all occurred values in the time series matching ALPHA(ti+1)<=ALPHA(t+1)*=−0.10% and the basis of probability (X). Given the today IBM closing price, the user can first set the desired target price V(t+1)* and then get the value of ALPHA(t+1)* or, vice versa, he can first set the desired ALPHA(t+1)* and then get the target price V(t+1)* [given V(t), $V_{(t+1)*}=V_{(t)}$times$(1+ALPHA_{(t+1)*}\%)$ or $ALPHA_{(t+1)*}\%=(V_{(t+1)*}-V_{(t)})/V_{(t)}$]. It can be noted that ALPHA(t+1)* can be defined as the user's desired target percentage change in (t+1), whereas V(t+1)* can be defined as the user's desired target price in (t+1).

Section 5

In Section 2 for determining the basis of probability the method has been described using the last available values (e.g. present day values at time=t) of ALPHA(t), BETA(t) and GAMMA(t) and designating such values as ALPHA(t)*, BETA(t)*, and GAMMA(t)*, that represent the structure of the price action related to the current market condition. It should be noted that instead of using only the last available values (t), it may be desirable also to use the next-to-last available values (t−1). Assuming for example that, before occurring a positive variation (1up) in the last available day (t), the next-to-last available values show a negative trend characterized by 4 consecutive down (GAMMA=4down). In this case the user could be interested in including within the criteria of selection even those events matching GAMMA=4down. For example, if the criteria of selection were GAMMA(t)*=1up, ALPHA(t)*>=0.20%, and BETA(t)*>=0.20% (for the last available day), we would obtain a basis of probability of, let us say, 150 occurrences. If we include also GAMMA(t−1)*=4down among the criteria of selection to determine the basis of probability, we need to match occurrences of GAMMA(ti)=GAMMA(t−1)*=4down, followed on the day after by GAMMA(t)*=1up, ALPHA(t)*>=0.20%, and BETA(t)*>=0.20%, and, accordingly, the basis of probability would be different (and for sure smaller than 150 occurrences), as we increased the criteria of selection. In other words, by changing (in the example, adding) the criteria of selection to determine the basis of probability, we change the basis of probability itself. In this case the selection has been made applying the criteria on two different days: GAMMA(t)*=1up, ALPHA(t)*>=0.20%, and BETA(t)*>=0.20%, for the last available day (t) and GAMMA(t−1)*=4down, for the next-to-last available day (t−1). More generally, the basis of probability has been performed by selecting occurrences in the time series matching 1) all values GAMMA(ti)=GAMMA(t−1)*=4down; and 2) all values GAMMA(ti+1)=GAMMA(t)*=1up, ALPHA(ti+1)>=ALPHA(t)*=0.20%, and BETA(ti+1)>=BETA(t)*=0.20%, at the same time. Therefore, summing up contents of Section 2 and the above, the general criteria for determining the basis of probability are to be chosen among the following:

For each Possible ALPHA(t−n)* being t the time of the last available data and n=0, 1, 2 . . .

For Values of ALPHA(t−n)* Positive or Equal to Zero
  $GAMMA_{(ti-n)}$=>GAMMA(t−n)*;
  $ALPHA_{(ti-n)}$=>X1;
  X1<=$ALPHA_{(ti-n)}$<=Y1; where 0<=X1<Y1, 0<=X2<Y2
  $BETA_{(ti-n)}$=>X2;
  X2<=$BETA_{(ti-n)}$<=Y2;

For Values of ALPHA(t−n)* Negative or Equal to Zero
  $GAMMA_{(ti-n)}$=<GAMMA(t−n)*;
  $ALPHA_{(ti-n)}$=<X1;
  Y1<=$ALPHA_{(ti-n)}$=<X1; where 0>=X1>Y1, 0>=X2>Y2
  $BETA_{(ti-n)}$=<X2;
  Y2<=$BETA_{(ti-n)}$=<X2;

Once the calculation is performed for each possible ALPHA(t−n)* according to the selected criteria, the basis of probability will be given by the total number of occurrences or "hits" related to ALPHA(ti), BETA(ti) and GAMMA(ti) resulting from selecting all values of each ALPHA(ti−n), BETA(ti−n) and GAMMA(ti−n) matching respectively each ALPHA(ti−n)*, BETA(ti−n)* and GAMMA(ti−n)* at the same time and according to the time order (from the highest value of n to n=0). Therefore, the structure of the price action related to the current market condition very often refers only to the last available data, but sometimes even to data related to previous days. In either case, we refer to the current market condition.

Section 6

In Section 4. we have considered the probability of an event occurring the day after (t+1) the last available day (t) of the time series: given a certain basis of probability, the user can look up desired values of ALPHA(t+1)*, that is to say, values ALPHA(t+1) occurred "tomorrow" (t+1) in the time series matching ALPHA(t+1)*. The method can be used also to forecast the probability of occurrence of a specific event 1) on a time (t+n); 2) by a time (t+n); or 3) on a time (t+n) subject to the occurrence of an event on a time (t+n;m), being m=n+q, q=1,2, . . .

More generally, besides to what we have described in Section 4., that is to say, 1. the probability P(t+1) that the today (t) IBM closing price will change by at least −0.10% tomorrow (t+1), being ALPHA(t+1)*=−0.10%; the method can also provide the users with:
2. the probability P(t+2) that the today (t) IBM closing price will change by at least −0.10% on the day after tomorrow (t+2), being ALPHA(t+2)*=−0.10%;
3. the probability P(t#2) that the today (t) IBM closing price will change by at least −0.10% by the day after tomorrow (t+2), being ALPHA(t#2)*=−0.10%;
4. the probability P(t+1;2) that the tomorrow (t+1) IBM closing price will change by at least −0.10% on the day after tomorrow (t+2), being ALPHA(t+1;2)*=−0.10%

The first 3 probabilities may be calculated upon the same basis of probability, whereas P(t+1;2) is necessarily calculated upon a different basis of probability.

The only difference between P(t+1) and P(t+2) is that P(t+1) is calculated by matching occurrences in the time series of values ALPHA(ti+1)<=ALPHA(t+1)*=−0.10% as above described; whereas P(t+2) is calculated by matching occurrences of values ALPHA(ti+2)<=ALPHA(t+2)*=−0.10%, being values of $ALPHA_{(t+2)*}\%=(V_{(t+2)*}-V_{(t)})$ In general, given a certain basis of probability (X), the probability P(t+n) that the today (t) IBM closing price will change by at least −0.10% on the n-th day from today (t+n) is given by the percentage ratio of the number of occurrences in the time series of values ALPHA(t+n) matching ALPHA(t+n)*, above X (given V(t), $V_{(t+n)*}=V_{(t)}$times$(1+ALPHA_{(t+n)*}\%)$ or $ALPHA_{(t+n)*}\%=(V_{(t+n)*}-V_{(t)})/V_{(t)}$. It can be noted that ALPHA(t+n)* can be defined as the user's desired target percentage change in (t+n), whereas V(t+n)* can be defined as the user's desired target price in (t+n) (see FIG. 9).

Probabilities P(t#2) are calculated by matching occurrences of values ALPHA(ti#2)<=ALPHA(t#2)*=−0.10%, being each selected value of ALPHA(ti#2) in the time series equal to the smallest value between values of ALPHA(ti+1) and ALPHA(ti+2); were ALPHA(t#2)*>0, we would select values of ALPHA(ti#2) equal to the greatest value between values of ALPHA(ti+1) and ALPHA(ti+2) matching in the time series ALPHA(t#2)* (mutatis mutandis, as for ALPHA (t#2)*=0). In general, given a certain basis of probability (X), the probability P(t#n) that the today (t) IBM closing price will change by at least −0.10% by the n−th day from today (t+n) is given by the percentage ratio of the number of occurrences in the time series of values ALPHA(ti#n) matching ALPHA(t#n)*, above X (being values of ALPHA (ti#n) equal to the smallest/greatest/neutral values of all values of ALPHA(ti+n) included from (ti) to (ti+n) [ALPHA (ti+1), ALPHA(ti+2), . . . ALPHA(ti+n)], as defined above.

Probability P(t+1;2) is calculated upon a different basis of probability, as the starting price is the tomorrow (t+1) IBM closing price. As, by definition, we do not know the tomorrow price, we can assume the target price V(t+1)* (as described in Section 4.) as the tomorrow price. Assuming the example for P(t+1) as a reference for this purpose, the basis of probability (as a result of a further selection) will be given by matching occurrences of values ALPHA(ti+1)<=ALPHA (t+1)*=−0.10% (see Section 4.). Now we can calculate P(t+1;2) by matching occurrences of values ALPHA(ti+1; 2)<=ALPHA(t+1;2)*<=−0.10, being values of ALPHA$_{(t+1;2)}$·%=(V$_{(t+1;2)*}$−V$_{(t+1)*}$)/V$_{(t+1)*}$ and V$_{(t+1)*}$=V$_{(t)}$times(1+A is the desired target price in (t+2) and ALPHA(t+1;2)* the desired target percentage change in (t+2). P(t+1;2) will be given by the percentage ratio between such matched values and the basis of probability.

Section 7

What we have seen in Sections 4 and 6 can be generalized as follows:

given a certain basis of probability, the probability P(t+n) that the IBM closing price taken in the last available time unit of the time series (t) will change by (at least, at most, etc.) a certain percentage value ALPHA(t+n)* on the time (t+n), being n=1,2, . . . ; given V(t) the IBM closing price taken in (t), V$_{(t+n)*}$=V$_{(t)}$times(1+ALPHA$_{(t+n)*}$%) or ALPHA$_{(t+n)*}$%=(V$_{(t+n)*}$−V$_{(t)}$)/V$_{(t)}$; being ALPHA(t+n)* the percentage change selected by the user according to the following possible general criteria:
ALPHA(t+n)*<>=x1;
x1<=ALPHA(t+n)*<=x2;
being x1 and x2<>=0 and x1<>x2;
is given by the percentage ratio between the number of occurrences in the time series of values ALPHA(ti+n) matching ALPHA(t+n)* according to the selected criteria, and the basis of probability;

given a certain basis of probability, the probability P(t#n) that the IBM closing price taken in the last available time unit of the time series (t) will change by (at least, at most, etc.) a certain percentage value ALPHA(t#n)* by the time (t+n), being n=1,2, . . . ; given V(t) the IBM closing price taken in (t), V$_{(t#n)*}$=V$_{(t)}$times(1+ALPHA$_{(t#n)*}$%) or ALPHA$_{(t#n)*}$%=(V$_{(t#n)*}$−V$_{(t)}$)/V$_{(t)}$; being ALPHA(t#n)* the percentage change selected by the user according to the following possible general criteria:
ALPHA(t#n)*<>=x1;
x1<=ALPHA(t#n)*<=x2;
being x1 and x2<>=0 and x1<>x2;

is given by the percentage ratio between the number of occurrences in the time series of values ALPHA(ti#n) matching ALPHA(t#n)* according to the selected criteria, and the basis of calculation, being values of ALPHA(ti#n) equal to the smallest/greatest/neutral values of all values of ALPHA(ti+n) included from (ti) to (ti+n) [ALPHA(ti+1), ALPHA(ti+2), . . . ALPHA(ti+n)], as defined above.

given a certain basis of probability, the probability P(t+n;m) that the IBM closing price assumed in the time (t+n) will change by (at least, at most, etc.) a certain percentage value ALPHA(t+n;m)* on the time (m), being m=n+q and q=1,2, . . . ; given V(t+n)* the IBM closing price assumed in (t+n),
V$_{(t+n;m)*}$=V$_{(t+n)*}$times(1+ALPHA$_{(t+n;m)*}$%) or ALPHA$_{(t+n;m)*}$%=(V$_{(t+n;m)*}$−V being ALPHA(t+n;m)* the percentage change selected by the user according to the following possible general criteria:
ALPHA(t+n;m)*<>=x1;
x1<>=ALPHA(t+n;m)*<>=x2;
being x1 and x2<>=0 and x1<>x2;

is given by the percentage ratio between the number of occurrences in the time series of values ALPHA(ti+n;m) matching ALPHA(t+n;m)* according to the selected criteria, and the basis of probability.

It should be noted that as for the Trend and Add-Trend Parameters, variations are to be considered in percentage term, whereas for the Volatility Parameters variations are in absolute term.

Furthermore, having defined P(t+n), P(t#n) and P(t+n;m), the invention can also perform combinations of them, such as P(t+n;#m), P(t#n;#m), and so on.

Section 8

Once obtained probabilities determined according to one of the criteria described above, the same procedure as discussed in Section 3 can be applied to calculate the TPI, the VPI and the MTPI, by changing accordingly what it needs to be changed in order to obtain consistent and meaningful indeces.

It should be further noted that although the inventive method has been described above in the context of obtaining the uptrend, downtrend and unchanged trend of a financial variable (e.g. a stock or bond price), the method may be equally applied to any time series represented variable. Moreover, although the method has been described using a daily time unit (e.g., a daily time series), it can be equally performed using time series of larger or smaller time units, up to a one-week time unit, such as an hour, half day, two-day or weekly unit (e.g. weekly closing price, etc.). However, the preferred method obtains accurate probability readings utilizing daily time series.

The method can additionally be used to derive compound probabilities based on the resulting probabilities derived from the method described above, such as to calculate the probability of the occurrence of two or more events at the same time, regarding two or more parameters of the same variable or two or more different variables (we consider just independent events). For example, if the method is used to calculate the PK, PJ and PY values for IBM (as PK1, PJ1 and PY1) and General Motors (as PK2, PJ2 and PY2) stock, the probability that an up trend will concurrently occur for both is given by PK1*PK2/100. Likewise, the probability that an up trend will occur for only one of the two stocks is given by PK1+PK2−PK2*PK1/100, etc.

The inventive method described above can be easily implemented using a general purpose digital computer running a dedicated software application such as Microsoft Excel or other spreadsheet-type program. The parameter terms can be accessed from a digital storage medium integrally formed with or proximately located by the computer or remotely accessed by the computer, with the database containing a history of financial market variables such as the closing prices of stocks, etc.

Thus, while there have shown and described and pointed out fundamental novel features of the invention as applied to preferred embodiments thereof, it will be understood that various omissions and substitutions and changes in the form and details of the method illustrated may be made by those skilled in the art without departing from the spirit of the invention. For example, it is expressly intended that all combinations of those method steps which perform substantially the same function in substantially the same way to achieve the same results are within the scope of the invention. Moreover, it should be recognized that steps and/or described in connection with any disclosed embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of forecasting an occurrence of an event for a market variable, comprising the steps of:
   (a) calculating a differential series from a series of terms of a financial parameter, said financial parameter series and said differential series each having successive-in-time terms, each term having one of a negative sign, a positive sign and a zero value;
   (b) locating term trends in said differential series to identify upward trends of terms having a positive sign, downward trends of terms having a negative sign, and unchanged trends of terms having a zero value;
   (c) calculating cumulative differentials of said located term trends to yield a cumulative differential series having successive-in-time terms;
   (d) identifying a series of sign state progressions from said cumulative differential series to yield a sign state progression series;
   (e) identifying a time position for a select term of the financial parameter series and identifying, for said time position, a corresponding term from each of said differential series, said cumulative differential series, and said sign state progression series; and
   (f) locating, for a time position prior to the time position of said select terms of said financial parameter series term, terms in the financial parameter series, the differential series, the cumulative differential series and the sign state progression series that satisfy predetermined criteria related to said terms identified in step (e) and utilizing said located terms from this step (f) to define a probability for forecasting an occurrence of an event for the market variable.

2. The method of claim 1, wherein said step (f) further comprises a step (f)(1) of identifying subsequent terms to said located terms in the financial parameter series, the differential series, the cumulative differential series and the sign state progression series that satisfy a second predetermined criteria and utilizing said identified subsequent terms to define the probability for forecasting the occurrence of the event for the market variable.

3. The method of claim 2, wherein said step (f) further comprises a step (f)(2) of summing an amount of occurrences of positive, negative and unchanged ones of the subsequent terms identified in said step (f)(1) and calculating, based on said summed amount of occurrences, historical probabilities expressed as percentage values that one of an uptrend, a downtrend and an unchanged trend will occur for a term in said financial parameter series subsequent to said identified term corresponding to the identified time position in said step (e).

4. The method of claim 1, wherein the financial parameter comprises a plurality of financial parameters containing trend, additional trend and volatility parameters.

5. The method of claim 3, wherein the financial parameter comprises a plurality of financial parameters containing trend, additional trend and volatility parameters.

6. The method of claim 5, wherein said step (f) further comprises a step (f)(3) of separately multiplying each calculated uptrend historical probability, each calculated downtrend historical probability and each calculated unchanged historical probability by a weighting factor to yield a plurality of weighted products for each said uptrend, downtrend and unchanged historical probabilities, and separately summing said uptrend weighted products (designated by (PK)), said downtrend weighted products (designated by (PJ)), and said unchanged weighted products (designated by (PY)).

7. The method of claim 6, further comprising the step of calculating a trend probability index (TPI) according to a formula:

$$TPI\ max(PK;PJ)+max(PK;PJ)/100*PY*r*s,$$

where s and r are weighting factors, and wherein PK, PJ and PY are derived from the trend parameters.

8. The method of claim 6, further comprising the step of calculating an additional trend probability index (ATPI) according to a formula:

$$ATPI=max(PK;PJ)+max(PK;PJ)/100*PY*r*s,$$

where s and r are weighting factors, and wherein PK, PJ and PY are derived from the additional trend parameters.

9. The method of claim 6, further comprising the step of calculating a volatility trend probability index (VTPI) according to a formula:

$$VTPI=max(PK;PJ)+max(PK;PJ)/100*PY*r*s,$$

where s and r are weighting factors, and wherein PK, PJ and PY are derived from the volatility parameters.

10. The method of claim 5, wherein the financial parameter comprises a plurality of main parameters and volatility parameters.

11. The method of claim 10, wherein said step (f) further comprises a step (f)(3) of separately multiplying each calculated uptrend historical probability, each calculated downtrend historical probability and each calculated unchanged historical probability by a weighting factor to yield a plurality of weighted products for each said uptrend, downtrend and unchanged historical probabilities, and separately summing said uptrend weighted products (designated by (PK)), said downtrend weighted products (designated by (PJ)), and said unchanged weighted products (designated by (PY)).

12. The method of claim 11, further comprising the step of calculating a main trend probability index (MTPI) according to a formula:

$$MTPI\ max(PK;PJ)+max(PK;PJ)/100*PY*r*s,$$

where s and r are weighting factors, and wherein PK, PJ and PY are derived from main parameters.

13. The method of claim 12, further comprising the step of calculating a volatility probability index (VTPI) according to a formula:

$$VTPI=max(PK;PJ)+max(PK;PJ)/100*PY*r*s,$$

where s and r are weighting factors, and wherein PK, PJ and PY are derived from volatility parameters.

14. A method of forecasting an occurrence of an event for a particular market variable, comprising the steps of:
  (a) identifying, for each of a plurality of financial parameters, a corresponding financial parameter series having successive-in-time terms;
  (b) calculating, for each said financial parameter series identified in step (a), a differential series having successive-in-time terms, each term having one of a negative sign, a positive sign and a zero value;
  (c) locating term trends in each said differential series to identify for said each differential series upward trends of terms having a positive sign, downward trends of terms having a negative sign, and unchanged trends of terms having a zero value;
  (d) calculating cumulative differentials of said located term trends from said each differential series to yield, for each said differential series, a cumulative differential series having successive-in-time terms;
  (e) identifying, from each said cumulative differential series yielded in step (d), a plurality of sign state progressions yielding a sign state progression series;
  (f) identifying a time position for a select financial parameter series term in each said financial parameter series and identifying, for said identified time position, corresponding terms from the respective differential series, cumulative differential series, and sign state progression series for the said each financial parameter series; and
  (g) locating, for a time prior to the time position of said select term of each of said financial parameter series, terms in the financial parameter series, differential series, cumulative differential series and sign state progression series for the said each financial parameter that satisfy predetermined criteria related to said terms identified in step (f) and utilizing said located terms from this step (g) to define a probability for forecasting an occurrence of an event for the particular market variable.

15. The method of claim 14, wherein step (g) further comprises a step (g)(1) of identifying subsequent terms to said located terms in each of the plurality of financial parameter series, differential series, cumulative differential series and sign state progression series that satisfy a second predetermined criteria, and utilizing said identified subsequent terms to define the probability for forecasting the occurrence of the event for the particular market variable.

16. The method of claim 15, wherein said step (f) further comprises a step (f)(2) of summing an amount of occurrences of positive, negative and unchanged subsequent terms identified in said step (g)(1) and calculating, based on said summed amount of occurrences, historical probabilities expressed as percentage values that one of an uptrend, a downtrend and an unchanged trend will occur for a term in said financial parameter series subsequent to said identified term corresponding to the identified time position in said step (f).

17. The method of claim 16, wherein said plurality of financial parameters comprise trend, additional trend and volatility parameters.

18. The method of claim 17, wherein said step (g) further comprises a step (g)(3) of separately multiplying each calculated uptrend historical probability, each calculated downtrend historical probability and each calculated unchanged historical probability by a weighting factor to yield a plurality of weighted products for said uptrend, downtrend and unchanged historical probabilities, and separately summing said uptrend weighted products (designated by (PK)), said downtrend weighted products (designated by (PJ)), and said unchanged weighted products (designated by (PY)).

19. The method of claim 18, further comprising the step of calculating a trend probability index (TPI) according to a formula:

$$TPI = max(PK;PJ) + max(PK;PJ)/100 * PY * r * s,$$

where s and r are weighting factors, and wherein PK, PJ and PY are derived from the trend parameters.

20. The method of claim 18, further comprising the step of calculating an additional trend probability index (ATPI) according to a formula:

$$ATPI = max(PK;PJ) + max(PK;PJ)/100 * PY * r * s,$$

where s and r are weighting factors, and wherein PK, PJ and PY are derived from the additional trend parameters.

21. The method of claim 18, further comprising the step of calculating a volatility trend probability index (VTPI) according to a formula:

$$VTPI = max(PK;PJ) + max(PK;PJ)/100 * PY * r * s,$$

where s and r are weighting factors, and wherein PK, PJ and PY are derived from the volatility parameters.

22. A method of forecasting an occurrence of an event for a market variable, comprising the steps of:
  (a) calculating a successive-in-time n-m term differential series, each term having one of a negative sign, a positive sign and a zero value, from a successive-in-time n term series of a financial parameter, being n>m>0;
  (b) locating term trends in said differential series to identify upward trends of consecutive terms having a positive sign, downward trends of consecutive terms having a negative sign, and unchanged trends of consecutive terms having a zero value;
  (c) calculating cumulative differentials of said located term trends to yield an n-m successive-in-time term cumulative differential series, with each trend represented by at least one term in the cumulative differential series;
  (d) identifying a series of sign state progressions from said cumulative differential series to yield an n-m term sign state progression series;
  (e) identifying a time position for a select term of the financial parameter series and identifying, for said time position, a corresponding term from each of said differential series, said cumulative differential series, and said sign state progression series; and
  (f) locating, for a time prior to the time position identified in step e), terms in the financial parameter series, the differential series, the cumulative differential series and the sign state progression series that satisfy predetermined criteria related to said terms identified in said step (e) and utilizing said located terms from this step (f) to define a probability for forecasting the occurrence of the event for the market variable.

23. The method of claim 22, wherein said step (f) further comprises a step (f)(1) of identifying subsequent terms to said located terms in the financial parameter series, the differential series, the cumulative differential series and the sign state progression series that satisfy a second predetermined criteria and utilizing said identified subsequent terms to define the probability for forecasting the occurrence of the event for the market variable.

24. The method of claim 23, wherein said step (f) further comprises a step (f)(2) of separately counting, based on said second predetermined criteria, respective ones of positive, negative and unchanged occurrences of the subsequent terms identified in said step (f)(1) and calculating, based on said counted amount of occurrences, historical probabilities expressed as percentage values that one of an uptrend, a downtrend and an unchanged trend will occur for a term in said financial parameter series subsequent to said identified term corresponding to the identified time position in said step (e).

25. The method of claim 24, wherein the financial parameter comprises a plurality of financial parameters containing trend, additional trend and volatility parameters.

26. The method of claim 25, wherein said step (f) further comprises a step (f)(3) of separately multiplying each uptrend historical probability, each downtrend historical probability and each unchanged historical probability by a respective one of a plurality of weighting factors, each weighting factor in said plurality corresponding to a financial parameter in said plurality of financial parameters, said plurality of weighting factors having a sum equal to 1, to yield a plurality of weighted products for each said uptrend, downtrend and unchanged historical probabilities, and separately summing said uptrend weighted products (designated by (PK)), said downtrend weighted products (designated by (PJ)), and said unchanged weighted products (designated by (PY)).

27. The method of claim 26, wherein the financial parameter comprises a plurality of main parameters and volatility parameters.

28. The method of claim 27, further comprising the step of calculating a trend probability index (TPI) according to a formula:

$$TPI=max(PK;PJ)+max(PK;PJ)/100*PY*s*r,$$

where s and r are weighting factors, and wherein PK, PJ and PY are derived from the trend parameters;

calculating an additional trend probability index (ATPI) according to a formula:

$$ATPI=max(PK;PJ)+max(PK;PJ)/100*PY*s*r,$$

where s and r are weighting factors, and wherein PK, PJ and PY are derived from the additional trend parameters;

calculating a volatility trend probability index (VTPI) according to a formula:

$$VTPI=max(PK;PJ)+max(PK;PJ)/100*PY*r*s,$$

where s and r are weighting factors, and wherein PK, PJ and PY are derived from the volatility parameters; and calculating a main trend probability index (MTPI) according to a formula:

$$MTPI=max(PK;PJ)+max(PK;PJ)/100*PY*r*s,$$

where s and r are weighting factors, and wherein PK, PJ and PY are derived from main parameters.

* * * * *